US010213857B2

(12) United States Patent
Qian et al.

(10) Patent No.: US 10,213,857 B2
(45) Date of Patent: Feb. 26, 2019

(54) WIRE CUTTING ELECTRODE AND WIRE CUTTING DEVICE USING THE SAME

(71) Applicant: Beijing FUNATE Innovation Technology Co., LTD., Beijing (CN)

(72) Inventors: Li Qian, Beijing (CN); Yu-Quan Wang, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 423 days.

(21) Appl. No.: 14/693,897

(22) Filed: Apr. 23, 2015

(65) Prior Publication Data
US 2015/0306690 A1   Oct. 29, 2015

(30) Foreign Application Priority Data

Apr. 23, 2014  (CN) .......................... 2014 1 0164703

(51) Int. Cl.
*B23H 7/08* (2006.01)
(52) U.S. Cl.
CPC ..................... *B23H 7/08* (2013.01)
(58) Field of Classification Search
CPC .......... B23H 7/08; B82Y 30/00; B82Y 40/00; B32B 2310/022; B22F 1/025; B29K 2105/167; B29K 2313/02; B29K 2105/124; B29K 2995/0005; B29L 2031/707; B21C 37/047; B29B 15/14
USPC .............. 219/202, 203, 522, 69.12; 423/447, 423/447.1, 447.3; 977/742, 752, 843
See application file for complete search history.

(56) References Cited

U.S. PATENT DOCUMENTS

| 6,986,877 | B2 * | 1/2006 | Takikawa | B82Y 30/00 |
| | | | | 423/447.3 |
| 7,800,010 | B2 * | 9/2010 | Kita | B23H 7/104 |
| | | | | 219/69.12 |
| 8,318,295 | B2 | 11/2012 | Wang et al. | |
| 8,323,607 | B2 * | 12/2012 | Liu | B82B 3/0047 |
| | | | | 423/447.1 |
| 8,692,716 | B2 * | 4/2014 | Biris | H01Q 1/38 |
| | | | | 257/E33.001 |
| 8,999,453 | B2 * | 4/2015 | Shah | C08L 25/02 |
| | | | | 427/407.1 |

(Continued)

FOREIGN PATENT DOCUMENTS

| CN | 2178579 | 10/1994 |
| CN | 101437663 | 5/2009 |

(Continued)

*Primary Examiner* — Dana Ross
*Assistant Examiner* — Joe E Mills, Jr.
(74) *Attorney, Agent, or Firm* — ScienBiziP, P.C.

(57) ABSTRACT

A wire cutting electrode which includes a carbon nanotube composite wire, a tensile strain rate of the carbon nanotube composite wire being less than or equal to 3%. The carbon nanotube composite wire includes a carbon nanotube wire and a metal layer. The carbon nanotube wire consists of a plurality of carbon nanotubes oriented around a longitudinal axis of the carbon nanotube composite wire. A twist of the carbon nanotube wire ranges from 10 r/cm to 300 r/cm. A diameter of the carbon nanotube wire ranges from 1 micron to 30 microns. The metal layer is coated on an outer surface of the carbon nanotube wire, and a thickness of the metal layer ranges from 1 micron to 5 microns. A wire cutting device using the wire cutting electrode is also provided.

17 Claims, 4 Drawing Sheets

(56) References Cited

U.S. PATENT DOCUMENTS

| | | | | |
|---|---|---|---|---|
| 9,523,162 B2* | 12/2016 | Wei | ................. | C01B 31/0226 |
| 2004/0089636 A1* | 5/2004 | Gonnissen | ............. | B23H 7/08 |
| | | | | 219/69.1 |
| 2007/0116631 A1* | 5/2007 | Li | ................. | B82Y 30/00 |
| | | | | 423/447.3 |
| 2007/0214623 A1* | 9/2007 | Lee | ................. | G01N 27/24 |
| | | | | 29/25.35 |
| 2007/0237959 A1* | 10/2007 | Lemaire | ............. | B82Y 30/00 |
| | | | | 428/408 |
| 2008/0170982 A1* | 7/2008 | Zhang | ............. | B82Y 10/00 |
| | | | | 423/447.3 |
| 2009/0208742 A1* | 8/2009 | Zhu | ............. | D06M 15/333 |
| | | | | 428/367 |
| 2010/0178825 A1* | 7/2010 | Shah | ............. | D02G 3/16 |
| | | | | 442/188 |
| 2010/0308489 A1* | 12/2010 | Feng | ............. | B82Y 30/00 |
| | | | | 264/105 |
| 2011/0036828 A1* | 2/2011 | Feng | ............. | H05B 3/342 |
| | | | | 219/529 |
| 2011/0051447 A1 | 3/2011 | Lee | | |
| 2011/0094777 A1* | 4/2011 | Swift | ............. | C08G 59/226 |
| | | | | 174/257 |
| 2011/0095237 A1 | 4/2011 | Liu et al. | | |
| 2011/0097512 A1* | 4/2011 | Zhou | ............. | H01B 1/04 |
| | | | | 427/545 |
| 2011/0100959 A1* | 5/2011 | Onodera | ............. | B23H 7/065 |
| | | | | 219/69.13 |
| 2011/0155713 A1 | 6/2011 | Wang et al. | | |
| 2012/0273465 A1* | 11/2012 | Seong | ............. | B21C 1/003 |
| | | | | 219/69.15 |
| 2013/0110215 A1* | 5/2013 | Fan | ............. | A61N 1/056 |
| | | | | 607/119 |
| 2013/0119548 A1* | 5/2013 | Avouris | ............. | B82Y 10/00 |
| | | | | 257/762 |
| 2013/0202844 A1* | 8/2013 | Tam | ............. | F41H 5/0485 |
| | | | | 428/107 |
| 2013/0248494 A1* | 9/2013 | Inaba | ............. | B23H 1/10 |
| | | | | 219/69.12 |
| 2013/0291286 A1* | 11/2013 | Stuckey | ............. | D02G 1/02 |
| | | | | 2/243.1 |
| 2014/0028178 A1* | 1/2014 | Liu | ............. | H01J 9/025 |
| | | | | 313/346 R |
| 2014/0059971 A1* | 3/2014 | Jelle | ............. | C01B 33/187 |
| | | | | 52/741.4 |
| 2014/0099852 A1* | 4/2014 | Guo | ............. | H01J 1/304 |
| | | | | 445/50 |
| 2014/0137398 A1* | 5/2014 | Wei | ............. | H04R 23/002 |
| | | | | 29/594 |
| 2014/0170453 A1* | 6/2014 | Kwon | ............. | H01M 4/13 |
| | | | | 429/94 |
| 2014/0178726 A1* | 6/2014 | Kwon | ............. | H01M 4/70 |
| | | | | 429/94 |
| 2014/0183927 A1* | 7/2014 | Baym | ............. | B26D 1/547 |
| | | | | 299/35 |
| 2014/0185777 A1* | 7/2014 | Liu | ............. | H01J 35/065 |
| | | | | 378/122 |
| 2014/0217643 A1* | 8/2014 | Nikawa | ............. | B82Y 30/00 |
| | | | | 264/299 |
| 2014/0227572 A1* | 8/2014 | Kwon | ............. | H01M 2/18 |
| | | | | 429/94 |
| 2014/0238013 A1* | 8/2014 | Wu | ............. | F03G 7/06 |
| | | | | 60/528 |
| 2015/0152852 A1* | 6/2015 | Li | ............. | H02N 11/006 |
| | | | | 60/528 |
| 2015/0167205 A1* | 6/2015 | Cooper | ............. | D02G 3/16 |
| | | | | 57/295 |
| 2015/0361591 A1* | 12/2015 | Watanabe | ............. | D06M 13/11 |
| | | | | 523/435 |
| 2016/0064156 A1* | 3/2016 | Mirvakili | ............. | H01G 11/30 |
| | | | | 361/502 |
| 2016/0074950 A1* | 3/2016 | Sasaki | ............. | B23H 7/36 |
| | | | | 219/69.12 |

FOREIGN PATENT DOCUMENTS

| | | |
|---|---|---|
| CN | 101633500 | 1/2010 |
| CN | 101976594 | 2/2011 |
| CN | 102040212 | 5/2011 |
| CN | 102111926 | 6/2011 |
| CN | 103276486 | 9/2013 |
| CN | 203178958 | 9/2013 |
| TW | 200939249 | 9/2009 |
| TW | 201241843 | 10/2012 |

* cited by examiner

WIRE CUTTING ELECTRODE AND WIRE CUTTING DEVICE USING THE SAME

CROSS-REFERENCE TO RELATED APPLICATIONS

This application claims all benefits accruing under 35 U.S.C. § 119 from China Patent Application No. 201410164703.8, field on Apr. 23, 2014 in the China Intellectual Property Office, disclosure of which is incorporated herein by reference. The application is also related to copending applications entitled, "BINDING WIRE AND SEMICONDUCTOR PACKAGE STRUCTURE USING THE SAME", filed Apr. 23, 2015 Ser. No. 14/693,892; "CARBON NANOTUBE COMPOSITE WIRE", filed Apr. 23, 2015 Ser. No. 14/693,893; "HOT WIRE ANEMOMETER", filed Apr. 23, 2015 Ser. No. 14,693,894; "DEFROSTING GLASS, DEFROSTING LAMP AND VEHICLE USING THE SAME", filed Apr. 23, 2015 Ser. No. 14/693,895; "CONDUCTIVE MESH AND TOUCH PANEL USING THE SAME", filed Apr. 23, 2015 Ser. No. 14/693,898; "ELECTROMAGNETIC SHIELDING MATERIAL AND CLOTHING USING THE SAME", filed Apr. 23, 2015 Ser. No. 14/693,899; "MASS FLOWMETER", filed Apr. 23, 2015 Ser. No. 14/693,901.

BACKGROUND

1. Technical Field

The disclosure generally relates to electrical discharge machining

2. Description of Related Art

In recent years, electrical discharge wire cutting machining is used as a special precision machining technology. A working principle of the electrical discharge wire cutting machining is as follows: a continuously moving thin metal wire is used as a wire cutting electrode, a pulse discharge is formed between the wire cutting electrode and an object, and the pulse discharge is used to erode material from the object. The electrical discharge wire cutting machining has excellent machining precision, micronization, high efficiency, and low processing costs.

The wire cutting electrode plays an important role in the electrical discharge wire cutting machining. The wire cutting electrode needs to have excellent wear resistance, high temperature resistance, excellent surface roughness, excellent corrosion resistance, large tensile strength, and high conductivity. Conventional wire cutting electrodes are mostly molybdenum wire or brass wire. A diameter of conventional wire cutting electrodes mostly ranges from 30 microns to 50 microns. However, a tensile strength of the wire cutting electrode of this diameter will be reduced, and the durability of the wire cutting electrode will be poor. Especially when the diameter of conventional wire cutting electrodes is less than 30 microns, the tensile strength of the wire cutting electrode will be significantly decreased. The wire cutting electrode cannot meet actual requirements of an application.

BRIEF DESCRIPTION OF THE DRAWING

Implementations of the present technology will now be described, by way of example only, with reference to the attached figures.

DETAILED DESCRIPTION

Figure 1:
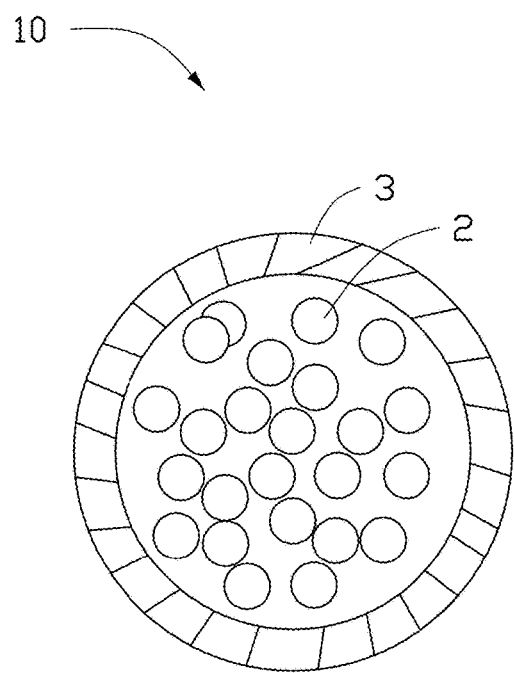
FIG. 1 is a cross-sectional view of an embodiment of a wire cutting electrode.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates that a first embodiment of a wire cutting electrode 10 includes a carbon nanotube composite wire 1. The wire cutting electrode 10 can be used in an electrical discharge wire cutting device.

The wire cutting electrode 10 includes a carbon nanotube composite wire 1.

In one embodiment, the wire cutting electrode 10 consists of a carbon nanotube composite wire 1. In one embodiment, the wire cutting electrode 10 includes a twisted wire formed by a plurality of carbon nanotube composite wires twisted about each other. A diameter of the wire cutting electrode 10 can range from about 2 microns to about 35 microns.

The carbon nanotube composite wire 1 includes a carbon nanotube wire 2 and a metal layer 3 coated on an outer surface of the carbon nanotube wire 2. In one embodiment, the carbon nanotube wire 2 includes a plurality of carbon nanotubes spirally arranged along an axial direction of the carbon nanotube wire 2. The plurality of carbon nanotubes are secured together by van der Waals attractive force. The carbon nanotube wire 2 is formed by twisting a carbon nanotube film. The carbon nanotube film can be drawn from a carbon nanotube array. The carbon nanotube film includes a plurality of carbon nanotubes parallel with each other. The plurality of carbon nanotubes in the carbon nanotube film are substantially oriented along an axial direction of the carbon nanotube film, and joined end-to-end by van der Waals force in the axial direction of the carbon nanotube film. Therefore when the carbon nanotube film is twisted, the plurality of carbon nanotubes in the carbon nanotube wire 2 are spirally arranged along the axial direction, in an end to end arrangement by van der Waals forces, and extends in a same direction.

In one embodiment, the carbon nanotube wire 2 has an S twist or a Z twist. During the twisting process of the carbon nanotube film, a space between adjacent carbon nanotubes becomes smaller along a radial direction of the carbon nanotube wire 2, and a contact area between the adjacent carbon nanotubes becomes larger along the radial direction of the carbon nanotube wire 2. Therefore, van der Waals attractive force between adjacent carbon nanotubes along the radial direction of the carbon nanotube wire 2 significantly increases, and adjacent carbon nanotubes in the carbon nanotube wire 2 are closely connected. In one embodiment, the space between adjacent carbon nanotubes along the radial direction of the carbon nanotube wire 2 is less than or equal to 10 nanometers. In one embodiment, the space between adjacent carbon nanotubes along the radial direction of the carbon nanotube wire 2 is less than or equal to 5 nanometers. In one embodiment, the space between adjacent carbon nanotubes along the radial direction of the carbon nanotube wire 2 is less than or equal to 1 nanometer. Since the space between adjacent carbon nanotubes in the radial direction of the carbon nanotube wire 2 is small, and adjacent carbon nanotubes are closely connected by van der Waals force, the carbon nanotube wire 2 includes a smooth and dense surface.

A diameter of the carbon nanotube wire 2 can range from about 1 micron to about 30 microns. A twist of the carbon nanotube wire 2 can range from about 10 r/cm to about 300 r/cm. The twist of the carbon nanotube wire 2 refers to the number of turns per unit length of the carbon nanotube wire 2. When the diameter of the carbon nanotube wire 2 is constant, an appropriate twist can give the carbon nanotube wire 2 excellent mechanical properties. With an increase in the rate of twist of the carbon nanotube wire 2, the space between adjacent carbon nanotubes along the radial direction of the carbon nanotube wire 2 will decrease, and an attractive force between adjacent carbon nanotubes along the radial direction of the carbon nanotube wire 2 will increase. However, when the increase in the twist is too large, the attractive force between adjacent carbon nanotubes along the radial direction of the carbon nanotube wire 2 will be reduced. When the diameter of the carbon nanotube wire 2 is less than 10 microns, the twist of the carbon nanotube wire 2 ranges from about 250 r/cm to about 300 r/cm. When the diameter of the carbon nanotube wire 2 ranges from about 10 microns to about 20 microns, the twist of the carbon nanotube wire 2 ranges from about 200 r/cm to about 250 r/cm. When the diameter of the carbon nanotube wire 2 ranges from about 25 microns to about 30 microns, the twist of the carbon nanotube wire 2 ranges from about 100 r/cm to about 150 r/cm. The mechanical strength of the carbon nanotube wire 2 is 5 to 10 times stronger than the mechanical strength of a gold wire of equal diameter. In one embodiment, the diameter of the carbon nanotube wire 2 is about 25 microns, and the twist of the carbon nanotube wire 2 is about 100 r/cm.

Since the carbon nanotube wire 2 includes a smooth and dense surface structure, the metal layer 3 and the carbon nanotube wire 2 can form a close bond, and the metal layer 3 is not easily detached from the carbon nanotube wire 2. The metal layer 3 is uniformly coated on the outer surface of the carbon nanotube wire 2. A thickness of the metal layer 3 ranges from about 1 micron to about 5 microns. When the thickness of the metal layer 3 ranges from about 1 micron to about 5 microns, a conductivity of the carbon nanotube composite wire 1 can reach 50 percent or more of a conductivity of the metal layer 3. When the thickness of the metal layer 3 is too small, for example less than 1 micron, the electrical conductivity of carbon nanotube composite wire 1 is not significantly improved; on the contrary, the metal layer 3 will be easily oxidized, the conductivity and service life of the carbon nanotube composite wire 1 will be further reduced. In addition, experiments show that when the thickness of the metal layer 3 is greater than a certain value, for example greater than 5 microns, the conductivity of the carbon nanotube composite wire 1 is not significantly increased in proportion to an increase of the diameter of the carbon nanotube composite wire 1.

A material of the metal layer 3 can be selected from the group consisting of gold, silver, copper, molybdenum, and tungsten, other metals and their alloys having good electrical conductivity. In one embodiment, the metal layer 3 is a copper layer, a thickness of the copper layer is about 5 microns; the conductivity of the carbon nanotube composite wire 1 is about $4.39 \times 10^7$ S/m, which is about 75% of the conductivity of copper.

A tensile strain rate of the carbon nanotube composite wire 1 is less than or equal to 3%. When the tensile strain rate of the carbon nanotube composite wire 1 is less than or equal to 3%, a jitter, caused by a tensile deformation of the carbon nanotube composite wire 1, can be reduced; thereby avoiding the short circuits. Furthermore, when the tensile strain rate of the carbon nanotube composite wire 1 is less than or equal to 3%, a tensile strength of the carbon nanotube composite wire 1 can be increased; thereby reducing wire breakages in wire cutting process and reduce loss. In one embodiment, the tensile strain rate of the carbon nanotube composite wire 1 is less than or equal to 1%.

Figure 2:
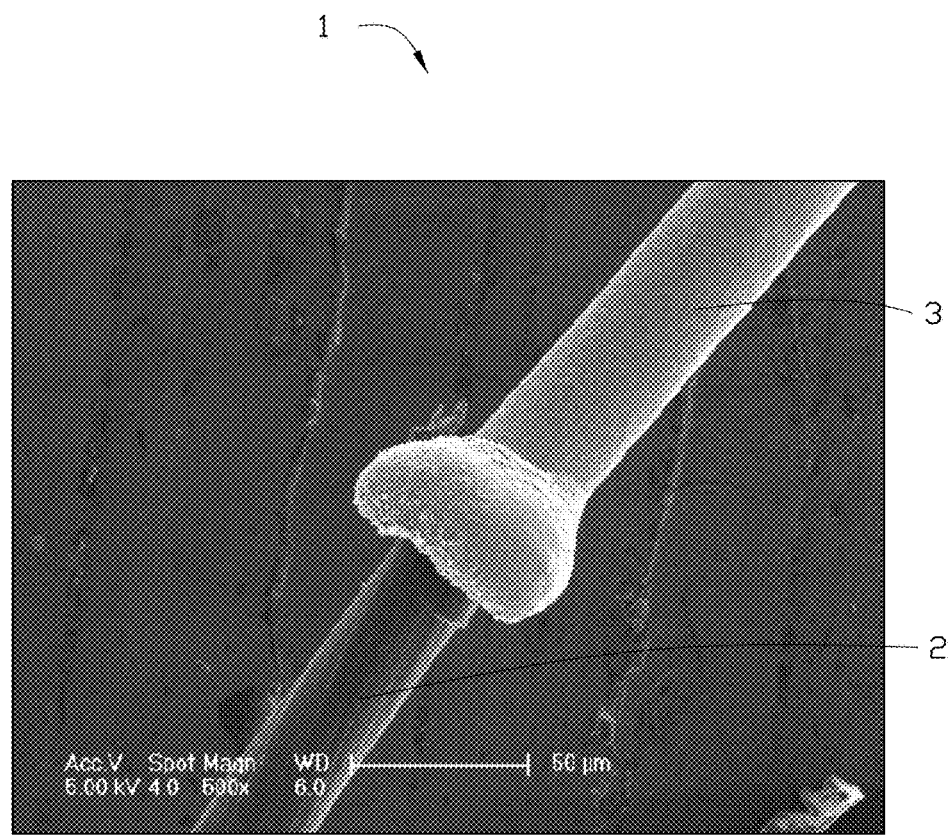
FIG. 2 shows a Scanning Electron Microscope image of an embodiment of a carbon nanotube composite wire.
Figure 3:
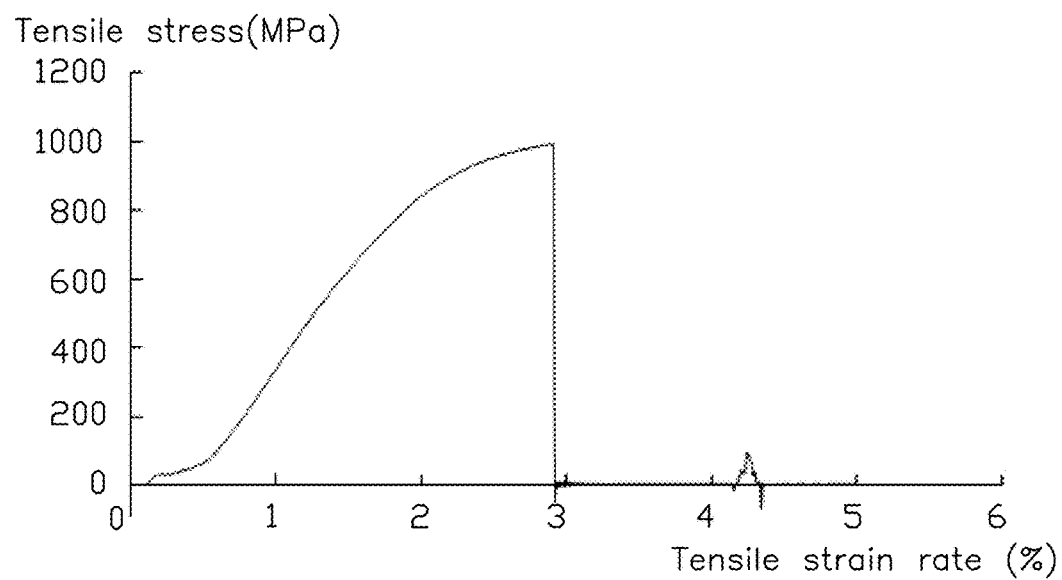
FIG. 3 shows a tensile stress curve of an embodiment of a carbon nanotube composite wire.

Referring to FIG. 2, in one embodiment, the diameter of the carbon nanotube composite wire 1 is about 35 microns; the tensile strength of the carbon nanotube composite wire 1 is more than 900 MPa, which is about 5 times stronger than the tensile strength of the gold wire of the same diameter. FIG. 2 shows that the tensile strain rate of the carbon nanotube composite wire 1 is about 3%.

The metal layer 3 can be formed on the outer surface of the carbon nanotube wire 2 by a method such as plating, electroless plating, vapor plating, or similar.

Compared with conventional wire cutting electrodes, the wire cutting electrode 10 is advantageous.

The thickness of the metal layer 3 ranges from about 1 micron to about 5 microns, which gives the metal layer 3 excellent oxidation resistance and durability, thereby reducing the losses of the wire cutting electrode 10.

Because the thickness of the metal layer 3 ranges from about 1 micron to about 5 microns, when the carbon nanotube composite wire 1 is used, the metal layer 3 plays a major conductive role; because of electrical skin effect, the current is mostly transmitted through a surface of the carbon nanotube composite wire 1, that is, current is mostly transmitted under and through the metal layer 3. Thus, the conductivity of the carbon nanotube composite wire 1 is significantly increased, thereby improving a work efficiency of the wire cutting electrode 10.

The diameter of the wire cutting electrode 10 can reach about 2 microns to about 35 microns, by optimizing the diameter and the twist of the carbon nanotube wire 2. Therefore, the wire cutting electrode 10 can be used for workpieces with higher precision requirements and requiring a smaller cutting diameter.

The tensile strain rate of the carbon nanotube composite wire 1 is less than or equal to 3%, by optimizing the diameter and the twist of the carbon nanotube wire 2. Therefore, the tensile strength of the carbon nanotube composite wire 1 can be significantly increased, which can avoid the short circuits caused by the jitter of the wire cutting electrode 10, and decrease wire breakages in wire cutting process.

Figure 4:
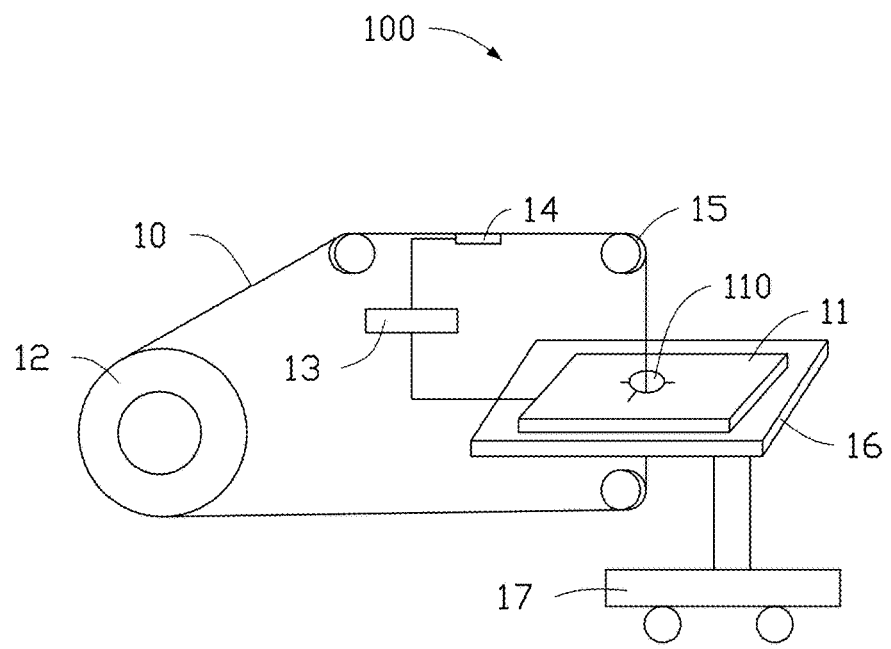
FIG. 4 is a schematic view of an embodiment of an electrical discharge wire cutting device.

Referring to FIG. 4, an electrical discharge wire cutting device 100 of an embodiment is provided. The electrical discharge wire cutting device 100 includes the wire cutting electrode 10, a workpiece 11, a wire storage device 12, a pulse power 13, a conductive connector 14, a wire feeding wheel 15, a workbench 16, and a motion control device 17. Each of the workpiece 11 and the workbench 16 includes a threading hole 110. The workpiece 11 is located on the workbench 16. The wire cutting electrode 10 goes through the threading hole 110, and two ends of the wire cutting electrode 10 connect with the wire storage device 12. A discharge gap is defined by the wire cutting electrode 10 and the workpiece 11. The wire cutting electrode 10 is used for cutting the workpiece 11. The wire feeding wheel 15 is used for transporting the wire cutting electrode 10 and fixing a mobile path of the wire cutting electrode 10. The pulse power 13 is used for providing a pulse voltage. A first electrode of the pulse power 13 connects with the wire cutting electrode 10 by the conductive connector 14, and a second electrode of the pulse power 13 connects with the workpiece 11. The motion control device 17 is used for controlling a horizontal movement of the workbench 16.

The threading hole 110 is an optional element. When the workpiece 11 and the workbench 16 do not include the threading hole 110, the wire cutting electrode 10 is located on a datum close to the workpiece 11, and the discharge gap is defined by the wire cutting electrode 10 and the workpiece 11.

The electrical discharge wire cutting device 100 works as follows: an insulating working fluid is sprayed into the discharge gap. The insulating working fluid is broken down under an action of the pulse voltage, thus an instantaneous discharge channel can be formed between the wire cutting electrode 10 and the workpiece 11. The instantaneous discharge channel allows an instant high temperature, and a part of the workpiece 11 can be melted and etched away by the instant high temperature. A workpiece with desired shape and size can be obtained by a continuous movement of the workpiece 11 and continuous pulse discharge.

The wire storage device 12, the conductive connector 14, the wire feeding wheel 15, and the workbench 16 are all optional components.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A wire cutting electrode comprising:
a carbon nanotube composite wire, the carbon nanotube composite wire comprising:
a carbon nanotube wire comprising a plurality of carbon nanotubes spirally arranged along an axial direction of the carbon nanotube wire; and
a metal layer, coated on an outer surface of the carbon nanotube wire,
wherein a carbon nanotube composite wire tensile strain rate is less than or equal to 3%; a carbon nanotube wire twist ranges from 10 r/cm to 300 r/cm, and a carbon nanotube wire diameter ranges from 1 micrometer to 30 micrometers and a metal layer thickness ranges from 1 micrometer to 5 micrometers, and a conductivity of the carbon nanotube composite wire reaches at least 50 percent or more of a conductivity of the metal layer.

2. The wire cutting electrode of claim 1, wherein the carbon nanotube composite wire tensile strain rate is less than or equal to 1%.

3. The wire cutting electrode of claim 1, wherein the carbon nanotube wire diameter ranges from 10 micrometers to 20 micrometers, and the carbon nanotube wire twist ranges from 200 r/cm to 250 r/cm.

4. The wire cutting electrode of claim 1, wherein the carbon nanotube wire diameter ranges from 25 micrometers to 30 micrometers, and the carbon nanotube wire twist ranges from 100 r/cm to 150 r/cm.

5. The wire cutting electrode of claim 1, wherein the plurality of carbon nanotubes are secured together by van der Waals attractive force.

6. The wire cutting electrode of claim 1, wherein the carbon nanotube wire has an S twist or a Z twist.

7. The wire cutting electrode of claim 1, wherein a space between adjacent carbon nanotubes along a radial direction of the carbon nanotube wire is less than or equal to 10 nanometers.

8. The wire cutting electrode of claim 7, wherein the space between adjacent carbon nanotubes along the radial direction of the carbon nanotube wire is less than or equal to 1 nanometer.

9. The wire cutting electrode of claim 1, wherein a carbon nanotube wire mechanical strength is 5 to 10 times of a gold wire of equal diameter.

10. The wire cutting electrode of claim 1, comprises of only one carbon nanotube composite wire.

11. The wire cutting electrode of claim 1, wherein the wire cutting electrode comprises twisted wire comprising a plurality of carbon nanotube composite wires twisted with each other.

12. An electrical discharge wire cutting device comprising:
a workpiece;
a wire cutting electrode; and
a pulse power comprising a first electrode electrically connects with the wire cutting electrode, and a second electrode electrically connects with the workpiece,
wherein the wire cutting electrode comprises a carbon nanotube composite wire, a carbon nanotube composite wire tensile strain rate is less than or equal to 3%; and the carbon nanotube composite wire comprises a carbon nanotube wire and a metal layer coated on an outer surface of the carbon nanotube wire, the carbon nanotube wire comprises a plurality of carbon nanotubes spirally arranged along an axial direction of the carbon nanotube wire, a carbon nanotube wire twist ranges from 10 r/cm to 300 r/cm, and a carbon nanotube wire diameter ranges from 1 micrometer to 30 micrometers; and a metal layer thickness ranges from 1 micrometer to 5 micrometers, and a conductivity of the carbon nanotube composite wire reaches at least 50 percent or more of a conductivity of the metal layer.

13. The wire cutting electrode of claim 12, wherein the carbon nanotube wire diameter ranges from 10 micrometers to 20 micrometers, and the carbon nanotube wire twist ranges from 200 r/cm to 250 r/cm.

14. The wire cutting electrode of claim 12, wherein the carbon nanotube wire diameter ranges from 25 micrometers to 30 micrometers, and the carbon nanotube wire twist ranges from 100 r/cm to 150 r/cm.

15. The wire cutting electrode of claim 1, wherein the wire cutting electrode consists of a carbon nanotube composite wire, and the carbon nanotube composite wire consists of the carbon nanotube wire and the metal layer.

16. The wire cutting electrode of claim 1, wherein the metal layer is a copper layer, a thickness of the copper layer is 5 micrometers, and the conductivity of the carbon nanotube composite wire is 75% of the conductivity of copper.

17. The wire cutting electrode of claim 1, wherein the diameter of the carbon nanotube composite wire is 35 micrometers, a tensile strength of the carbon nanotube composite wire is more than 900 MPa, and the tensile strength of the carbon nanotube composite wire is 5 times stronger than a tensile strength of a gold wire of equal diameter.

* * * * *